United States Patent
Varo et al.

[11] Patent Number: 5,459,360
[45] Date of Patent: Oct. 17, 1995

[54] PISTON-MOUNTED POWER GENERATOR, ESPECIALLY FOR TELEMETRY SYSTEMS

[75] Inventors: Richard G. Varo; Steven A. Archuleta, both of Columbus, Ind.

[73] Assignee: Cummins Engine Company, Inc., Columbus, Ind.

[21] Appl. No.: 181,460

[22] Filed: Jan. 14, 1994

[51] Int. Cl.⁶ .................................................. H02K 35/00
[52] U.S. Cl. .................................................. 310/24
[58] Field of Search ................................ 310/15, 17, 23, 310/24, 30, 34, 35, 14

[56] References Cited

U.S. PATENT DOCUMENTS

| | | | |
|---|---|---|---|
| 3,065,366 | 5/1959 | Speiser et al. | 310/15 |
| 3,105,153 | 8/1960 | James, Jr. | 290/1 |
| 3,206,609 | 4/1962 | Dawes | 290/1 |
| 4,019,103 | 4/1977 | Davis et al. | 318/37 |
| 4,631,455 | 12/1986 | Taishoff | 318/37 |
| 5,179,304 | 1/1993 | Kenjo et al. | 310/12 |

*Primary Examiner*—Steven L. Stephan
*Assistant Examiner*—Judson H. Jones
*Attorney, Agent, or Firm*—Sixbey, Friedman, Leedom & Ferguson

[57] ABSTRACT

A piston-mounted power generator has a piston-mounted magnet unit (1) formed of a coil (2) with a permanent magnet core (3) that is fitted with pole extensions (5, 6). The unit (1) is mounted to the piston skirt (8) with the pole extensions having a small clearance from the inner wall (10) of the piston cylinder formed by cylinder wall liner (12). Shallow grooves (14) are machined into the cylinder wall (10). The grooves (14) have a crescent-shaped longitudinal cross section, that extends circumferentially in the cylinder wall (10) for a distance that is only slightly longer than the width of the pole extensions. The width of each groove (14) is equal to the spacing between the pole extensions (5, 6) and the axial spacing between the adjacent pairs of grooves (14) is equal to the thickness of the pole extensions (5, 6). Electrical power is generated in the coil 2 by the rapid change in flux in the magnetic circuit linked through it as the effective gap between the poles and wall changes as the poles (5, 6) pass each of the grooves (14) and is maximized when the spacing of the poles and grooves results in the magnetic circuit being made and broken simultaneously at both poles. Transducers and telemetry modules (TTM) can be mounted within the interior of the piston and electrically connect to the coil to be powered thereby. To increase the power generated, the grooves (14') can be backfilled with a nonmagnetic material (15) by flame-spraying or the like. For special pistons, annular grooves can be used instead ones having the preferred crescent shape.

19 Claims, 5 Drawing Sheets

PISTON-MOUNTED POWER GENERATOR, ESPECIALLY FOR TELEMETRY SYSTEMS

BACKGROUND OF THE INVENTION

1. Field of the Invention

The present invention relates to piston-mounted devices for the generation of electrical power during reciprocation of the piston; particularly, to such a device which allow a powering of a telemetry package mounted on an engine piston for obtaining data concerning conditions at the piston during engine operation.

2. Description of Related Art

All engine manufacturers require data from pistons of operating engines, such as temperatures, strains, etc.; but, doing so has been limited by problems in transferring signals frown the reciprocating components, as well as the need to supply sufficient electrical power to activate transducers and circuits of telemetry systems without the temperature and test duration limitations of batteries.

At present, extensive mechanical modifications must be made to engines in order to incorporate short-lived "grasshopper" links for transferring signals by wire to the piston. Use of telemetry is severely limited by battery life or by the need to incorporate complex inductive power transfer systems requiring significant engine-specific modifications. A system used by Southwest Research Institute uses a ballistic core moving freely within a coil to generate electrical power for telemetry purposes. However, this device does not begin to operate until high engine speed, and does not provide sufficient power for general use, e.g., sufficient power is produced to enable only piston temperatures to be measured.

Numerous devices exist which use a piston arrangement for the generation of power by changing the magnetic flux in a coil. For example, U.S. Pat. No. 3,206,609 to Dawes discloses a reciprocating magnet located in a piston of a two-cycle engine, an alternating current being generated in a transformer coil surrounding the cylinder due to the moving magnetic field created by the moving piston. Additionally, Speiser, et al. U.S. Pat. No. 3,065,366 discloses pulse generator for controlling electrical equipment in which a piston-shaped permanent magnet which generates an electrical pulse in the output terminals of a coil as the magnetic flux through the coil is varied by moving the piston-shaped magnet passed the coil, and a free-piston generator of electric current in which the free piston has annular magnet on its periphery and in which the cylinder has annular grooves formed in its inside wall containing a nonmagnetic material such as a ceramic or epoxy is known from U.S. Pat. No. 3,105,153.

However, none of these patents disclose an arrangement which represents a practical approach for the generation of electrical power during reciprocation of the piston of an engine which allow powering of a telemetry package mounted on the engine piston for obtaining data concerning conditions at the piston during engine operation, nor can they be installed into an otherwise stock engine without requiring major modifications.

Thus, a need exists for a piston-mounted power generator suitable for engine piston telemetry systems which will enable in-cylinder measurements of strain, temperature, vibration, etc., to be obtained more extensively and effectively without requiring major structural changes to the engine, at idling speeds in addition to high operating speeds and for extended periods of time.

SUMMARY OF THE INVENTION

A primary object of the present invention is to provide a piston-mounted power generator suitable for engine piston telemetry systems which will enable in-cylinder measurements of strain, temperature, vibration, etc., to be obtained without requiring major structural engine modifications.

In keeping with the foregoing object, it is also an object of the present invention to provide a piston-mounted power generator which can be quickly and simply installed in existing engines.

Still a still further object of the invention is to provide a piston-mounted power generator which be able to produce sufficient power for extended periods of time, even at engine idling speeds.

Yet another and more specific object of the invention is to provide a piston-mounted power generator and telemetry unit which can be installed into an otherwise stock engine merely by replacing of the existing piston and liner with one in accordance with the present invention.

These objects and others are obtained in accordance with preferred embodiments of the present invention by mounting a permanent magnet unit to the skirt of an engine piston so as to have a small clearance relative to the wall of the engine cylinder, and with shallow grooves being formed in the facing wall of the engine cylinder which have an axial spacing corresponding to that of pole extensions of the magnet.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

Throughout the drawings, the same reference numerals are utilized, from embodiment to embodiment, to identify corresponding parts; but, with parts that differ from one embodiment to another being distinguished by a prime (') or double-prime (") designation.

DETAILED DESCRIPTION OF THE PREFERRED EMBODIMENTS

Figure 1:
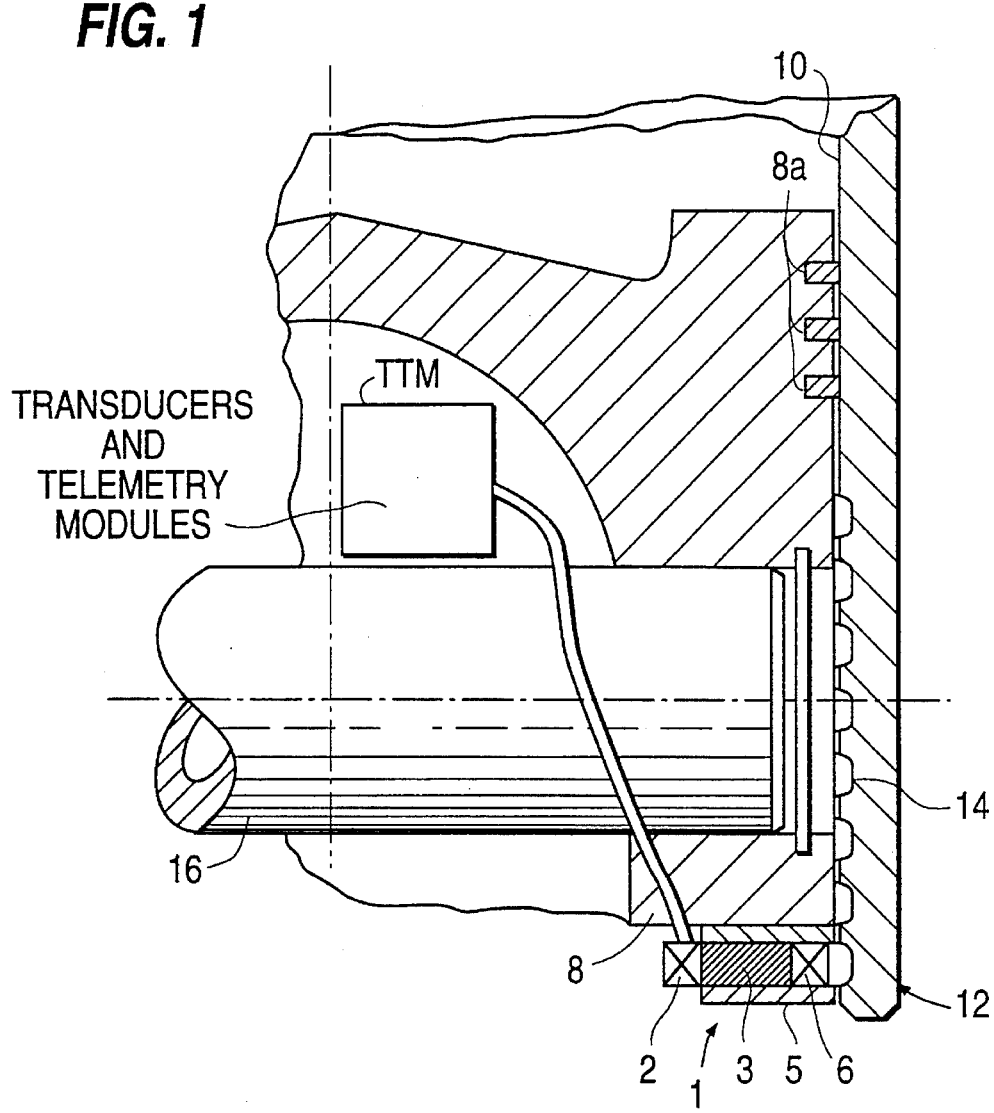
FIG. 1 is a partial cross-sectional view of a piston and cylinder equipped with a first embodiment of the present invention.
Figure 2:
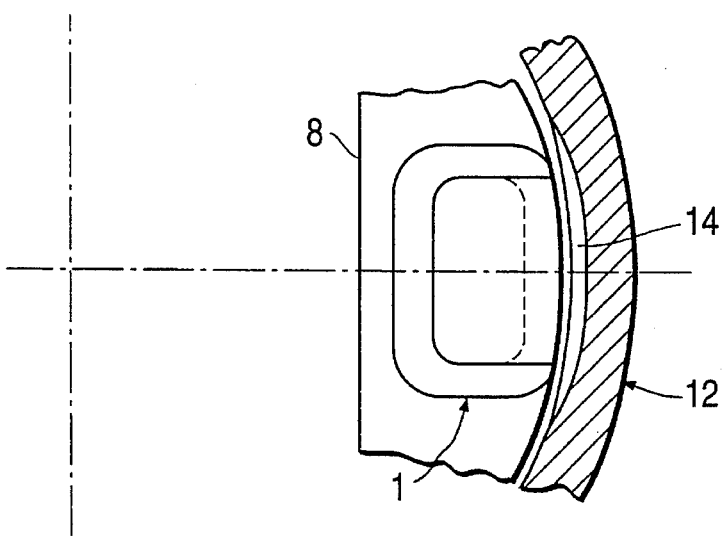
FIG. 2 a partial bottom view of the piston and cylinder of FIG. 1.

With reference to FIGS. 1 & 2, it can be seen that piston-mounted power generator of the present invention has a piston-mounted magnet unit 1 which comprises a coil 2 with a permanent magnet core 3 that is fitted with pole extensions 5 and 6. The unit 1 is mounted to the piston skirt 8 with the pole extensions having a small clearance from the inner wall 10 of the piston cylinder formed by cylinder wall liner 12. Shallow grooves 14 are machined into surface 10. The grooves 14 have a crescent-shaped longitudinal cross section, that extends circumferentially in the cylinder wall 10 for a distance that is only slightly longer than the width of the pole extensions, so that only a small portion of the bore of the cylinder wall 10 needs to be machined, for example, via a milling cutter, to produce the grooves. The width of each groove 14 is equal to the spacing between the pole extensions 5 and 6 and the axial spacing between the adjacent pairs of grooves 14 is equal to the thickness of the pole extensions 5, 6.

Since the piston rings 8a of the piston 8 should not traverse the open grooves 14, the grooves 14 should extend from the bottom of the liner 12 up to just below the bottom dead center (BDC) position of the lowermost piston ting. Electrical power is generated in the coil 2 by the rapid change in flux in the magnetic circuit linked through it as the effective gap between the poles and wall changes as the poles 5, 6 pass the grooves 14, and is maximized when the spacing of the poles and grooves results in the magnetic circuit being made and broken simultaneously at both poles. With the described open-groove an arrangement, power is generated for approximately 50% of each revolution in the form of a frequency and amplitude modulated voltage waveform, which is rectified, smoothed and regulated to provide a stable DC level to drive transducers and telemetry modules, TTM, which can be mounted within the interior of the piston as diagrammatically depicted in FIG. 1. For example, in one test setup, an output of 53 volts peak-to-peak across a 650 ohm load was produced at a speed equivalent to a 1450 engine rpm. The transducers may be, for example, conventional strain gages, thermocouples, and the like of any commercially available design known for engine monitoring and like purposes.

Figure 3:
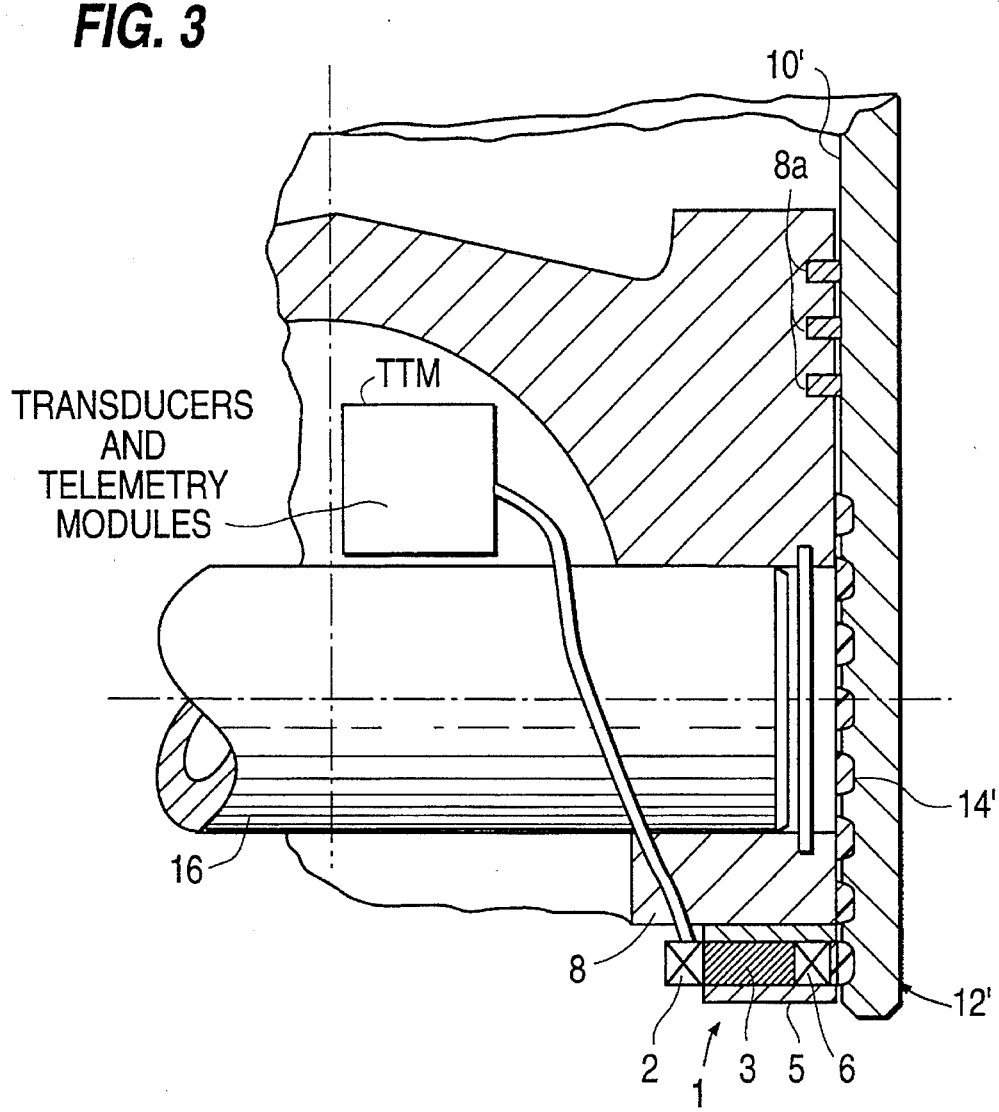
FIGS. 3 & 4 are views corresponding to FIGS. 1 & 2, respectively, showing a version of the first embodiment in which grooves in the cylinder wall are filled with nonmagnetic material.
Figure 4:
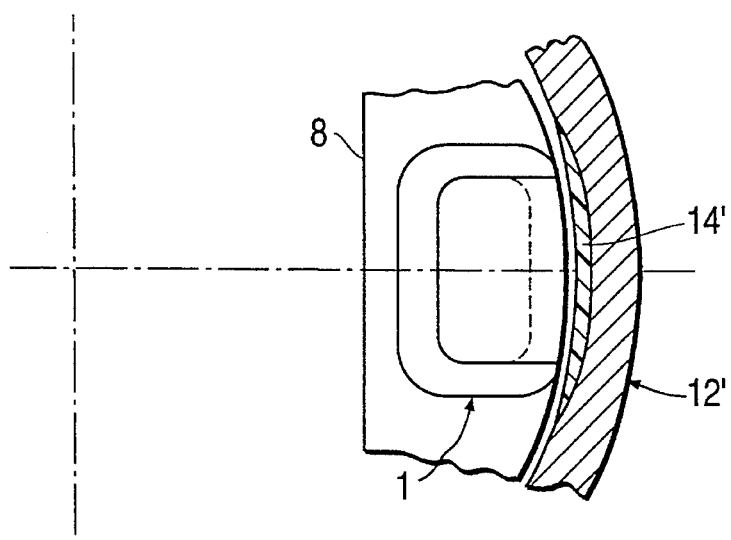

In order to increase the power generated, the grooves 14 can be backfilled with a nonmagnetic material 15, as shown for grooves 14' in FIGS. 3 & 4, by flame-spraying or the like prior to bore finishing. When this is done, the cylinder rings can be permitted to sweep over the filled grooves 14', so that the grooves can extend all the way up to the top dead center (TDC) position of the coil 2, thereby enabling power to be generated throughout entire engine cycle.

Figure 5:
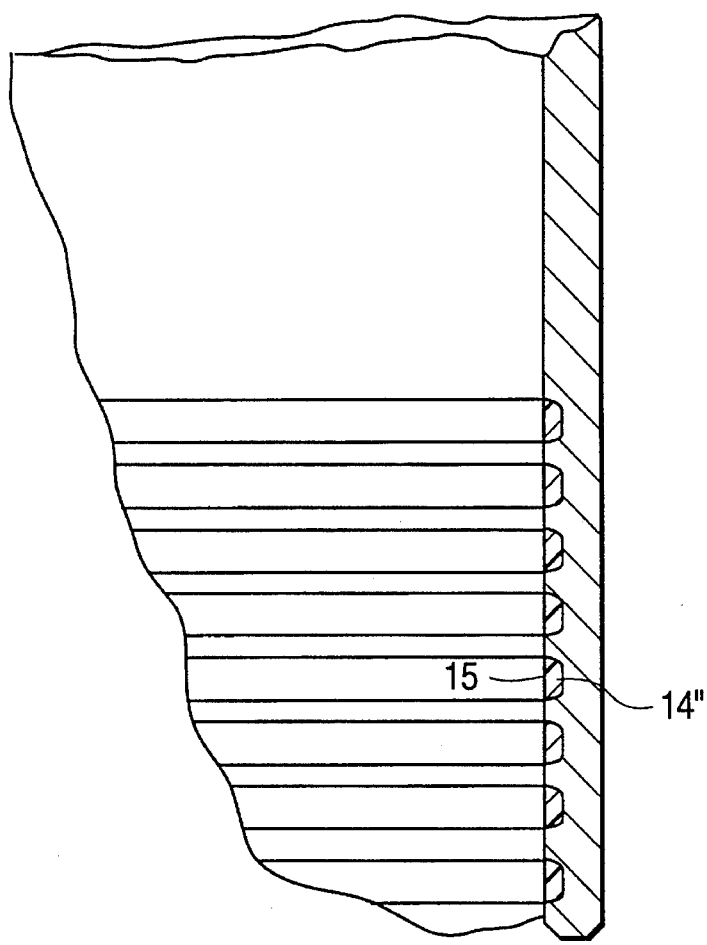
FIG. 5 is a partial cross-sectional view of a piston and cylinder equipped with a second embodiment of the present invention.
Figure 6:
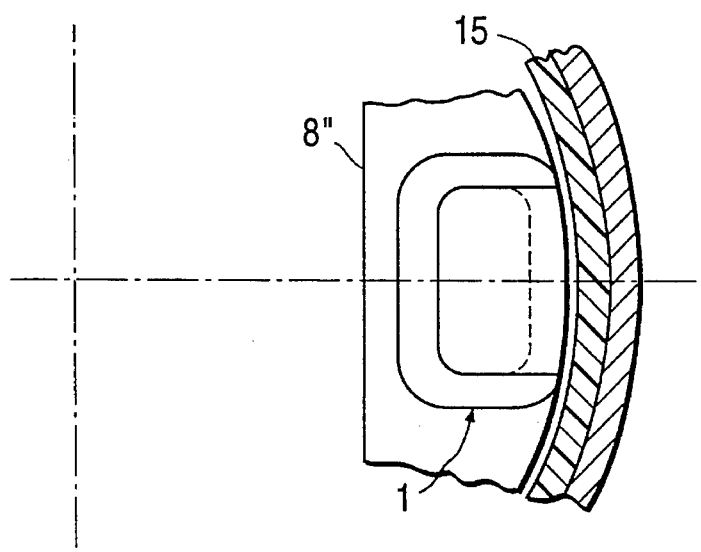
FIG. 6 a partial bottom view of the piston and cylinder of the second embodiment of FIG. 5.

The use of crescent-shaped grooves 14, 14' are preferred for use with conventional pistons (which are connected to a piston rod via a wrist pin 16, and thus, cannot circumferentially rotate) due to the ease and low cost by which they can be produced. However, for special pistons, such as spherical joint pistons which are able to circumferentially rotate, such crescent-shaped grooves are unsuitable since the assemblies 1 would not always be in alignment with the grooves 14, 14'. Accordingly, for such pistons 8", as shown in FIGS. 5 and 6, the cylinder wall 10" is provided with annular grooves 14" which, like grooves 14', may be backfilled with nonmagnetic material 15.

Figure 7:
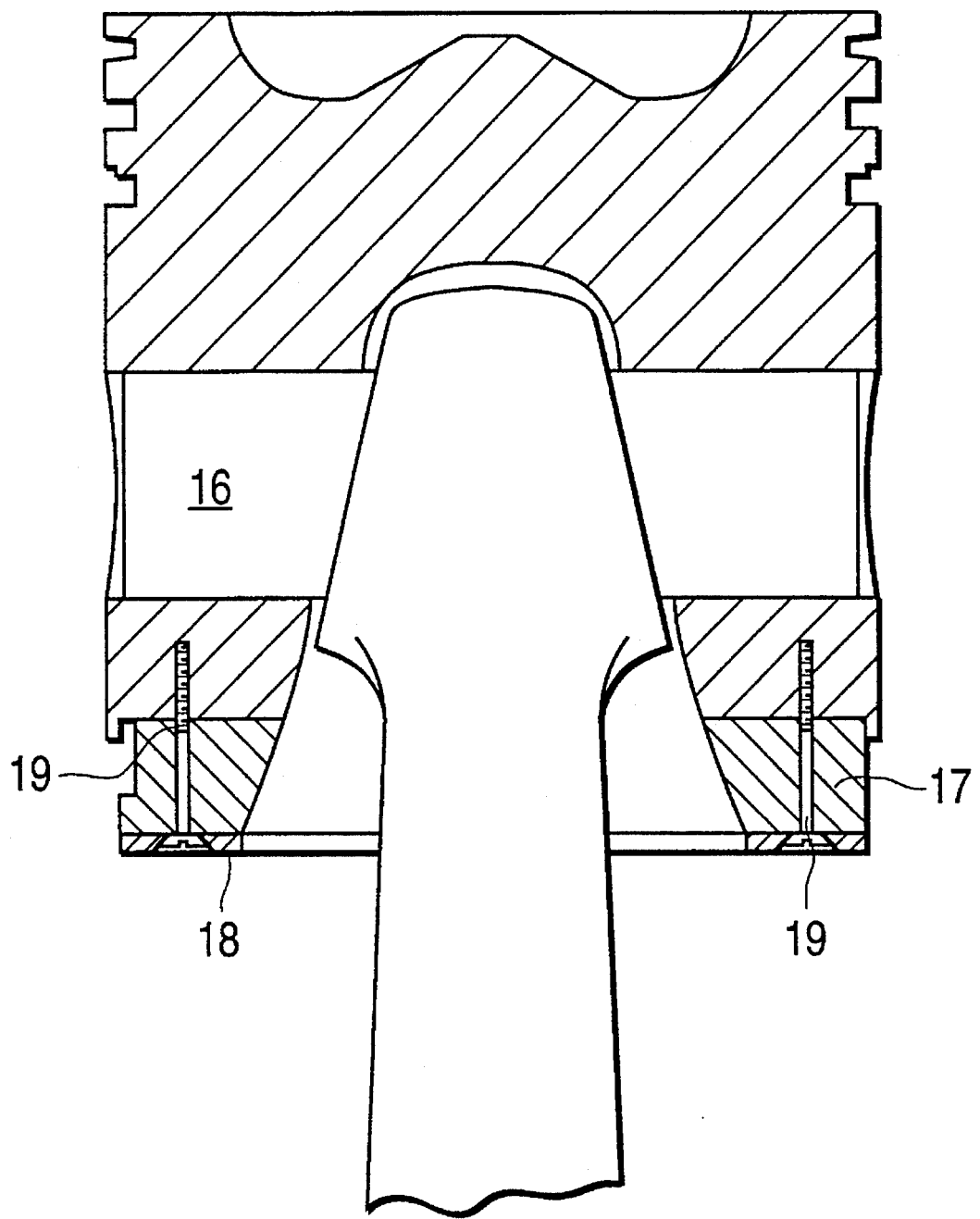
FIG. 7 illustrates a piston having a combined telemetry and power supply module.
Figure 8:
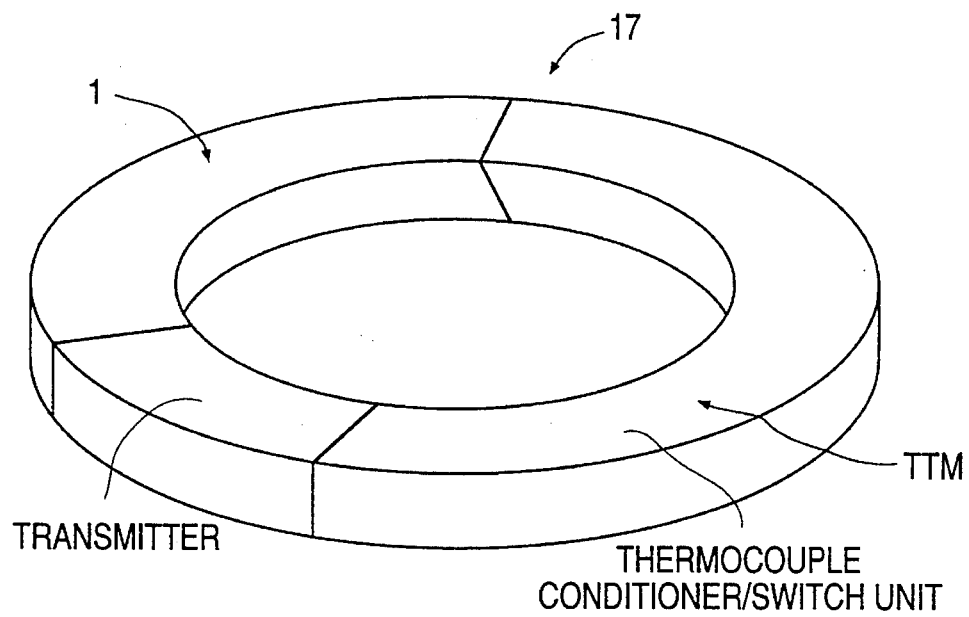
FIG. 8 schematically depicts the telemetry and power supply module of the FIG. 7 piston.

The telemetry modules, TTM, for transmitting the output(s) of the transducer(s), themselves, can be a commercially available short-range radio telemetry system or telemetry systems that use other transmission methods, e.g., infrared light. A suitable radio telemetry system can be obtained, for example, from PMD, Inc. of Melbourne, Fla. which includes module having a thermocouple conditioner/switch unit that is packaged with an FM transmitter. Such a module can be combined with the power generator magnet unit 1 of the present invention into a ring 17 (FIG. 8) that is mounted to the underside of the piston skirt 8 (FIG. 7), such as by a retaining ring 18 and mounting pins 19. This module also can be connected, for example, to thermocouples (not shown) embedded within the body of the piston. In such a case, each thermocouple, or other sensor, would be scanned, in turn, and the output used to modulate a radio frequency carder signal which is transmitted to the antenna of a stationary receiver mounted, e.g., within the crankcase. The received signal is then demodulated to extract the temperature information. All receiver-side electronics are line or battery powered in a conventional manner and form no part of this invention apart from the mere use thereof.

Figure 9:
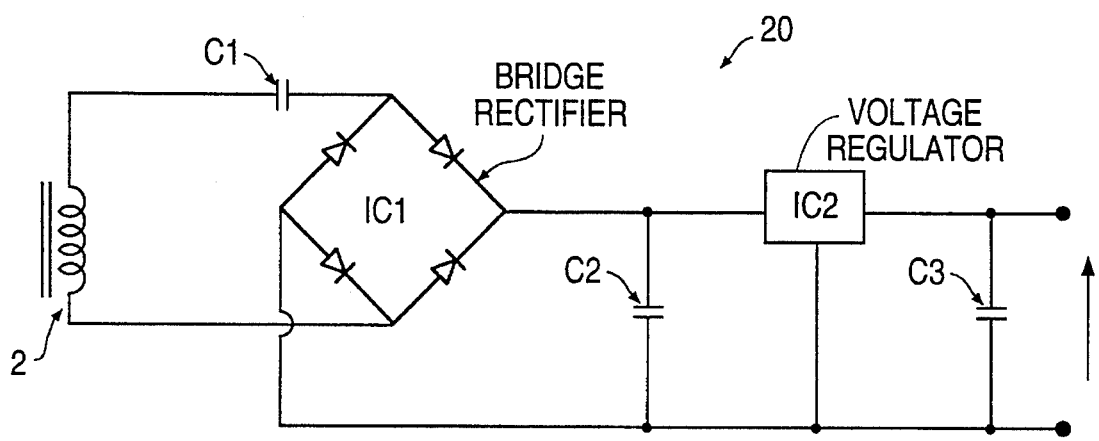
FIG. 9 is a circuit diagram of a power generator rectifier circuit in accordance with the present invention.

It is also noted that cyclic variation in piston speed during each engine revolution results in amplitude and frequency modulation of the generator output. Thus, in accordance with the present invention, the generator output is rectified and smoothed to produce a DC drive for the telemetry electronics. However, since overall output voltage varies with engine speed, the generator must be capable of providing sufficient output at the lowest anticipated operating speed (typically low idle). To this end, FIG. 9 shows a circuit diagram of a power generator rectifier circuit 20 that is designed to optimize output voltage at low idle speed by minimizing the source impedance.

In particular, a capacitor C1 forms a tuned circuit in conjunction with the inductance of the coil 2 of the; magnet unit 1 at the mean pulse frequency which corresponds to idle speed so as to form a resonant circuit with an overall impedance that is close to the DC resistance of the coil windings. Rectification and regulation are obtained by means of a dime bridge IC1, smoothing capacitors C2, C3 and voltage regulator IC2, the capacitor C2 being selected to ensure the maximum possible contribution from each generator pulse and yet reduce output voltage tipple with capacitor C3 serving to smooth the regulated DC voltage output of IC2.

While various embodiments in accordance with the present invention have been shown and described, it is understood that the invention is not limited thereto, and is susceptible to numerous changes and modifications as known to those skilled in the art. By way of example, even though the power generator of the present invention has been described for use in powering telemetry systems for measuring devices, such as strain gages, thermocouples, etc., it should be realized that the inventive power generator can be used to power any other type of electronic device that might be mounted on a piston or reciprocating component. Likewise, while only a single generator coil is present in the illustrated embodiments, multiple generator coils can be used to increase the available current or voltage. Therefore, this invention is not limited to the details shown and described herein, and includes all such changes and modifications as are encompassed by the scope of the appended claims.

Industrial Applicability.

The present invention will find a wide range of applicability to the measuring of in-cylinder operating conditions at reciprocating pistons of engines, compressors and other piston-driven equipment and the powering of any piston carded electronics. Furthermore, because the inventive power generator can be quickly installed without requiring major engine modifications, the invention will find applicability with respect to preexisting stock engines.

We claim:

1. A piston-mounted power generator comprising a permanent magnet unit, having a coil and magnet with a pair of axially spaced pole extensions, mounted to a skirt of a reciprocating piston, and shallow grooves formed in a facing wall of a cylinder within which the piston is mounted for reciprocation and which have an axial spacing corresponding to that of said pole extensions of the magnet; wherein said pole extensions have a radial clearance relative to the facing wall of the cylinder to enable a magnet circuit to be created through the cylinder wall from one pole extension to the other when each of the grooves is disposed between the pole extensions; and wherein each of the grooves has a depth sufficient to break said magnet circuit when each groove radially overlies one of the pole extensions.

2. A piston-mounted power generator according to claim 1, wherein said grooves are crescent-shaped in longitudinal cross section.

3. A piston-mounted power generator according to claim 2, wherein said grooves are filled with a nonmagnetic material.

4. A piston-mounted power generator according to claim 1, wherein said grooves are annular.

5. A piston-mounted power generator according to claim 4, wherein said grooves are filled with a nonmagnetic material.

6. A piston-mounted power generator according to claim 1, wherein said grooves are filled with a nonmagnetic material.

7. A piston-mounted power generator according to claim 1, wherein a transducer and telemetry module is mounted within the piston and is electrically connected to the coil of the magnet unit so as to be powered thereby.

8. A piston-mounted power generator according to claim 7, wherein said grooves are crescent-shaped in longitudinal cross section.

9. A piston-mounted power generator according to claim 8, wherein said grooves are filled with a nonmagnetic material.

10. A piston-mounted power generator according to claim 7, wherein said grooves are annular.

11. A piston-mounted power generator according to claim 10, wherein said grooves are filled with a nonmagnetic material.

12. A piston-mounted power generator according to claim 1, wherein the magnet unit forms part of annular generator and telemetry module assembly, said assembly having a ting-shaped body which is mounted to the underside of the piston skin and within which said magnet unit and a transmitter are provided.

13. A piston-mounted power generator according to claim 12, wherein a thermocouple conditioner/switch unit is also provided within said ring-shaped body.

14. A piston-mounted power generator according to claim 12, further comprising a rectifier circuit having means for optimizing output voltage from the coil by minimizing source impedance.

15. A piston-mounted power generator according to claim 14, wherein said means for optimizing comprises a capacitor which forms a tuned circuit in conjunction with the inductance of the coil of the magnet unit at a mean pulse frequency which corresponds to an engine idle speed so as to form a resonant circuit with an overall impedance that is close to the DC resistance of the coil.

16. A piston-mounted power .generator according to claim 14, wherein said rectifier circuit comprises a diode bridge, at least one smoothing capacitor and a voltage regulator for rectification and regulation of coil output.

17. A piston-mounted power generator according to claim 1, further comprising a rectifier circuit having means for optimizing output voltage from the coil by minimizing source impedance.

18. A piston-mounted power generator according to claim 17, wherein said means for optimizing comprises a capacitor which forms a tuned circuit in conjunction with the inductance of the coil of the magnet unit at a mean pulse frequency which corresponds to an engine idle speed so as to form a resonant circuit with an overall impedance that is close to the DC resistance of the coil.

19. A piston-mounted power generator according to claim 17, wherein said rectifier circuit comprises a diode bridge, at least one smoothing capacitor and a voltage regulator for rectification and regulation of coil output.

* * * * *

UNITED STATES PATENT AND TRADEMARK OFFICE
CERTIFICATE OF CORRECTION

PATENT NO. : 5,459,360
DATED : October 17, 1995
INVENTOR(S) : Richard G. Varo, et. al.

It is certified that error appears in the above-identified patent and that said Letters Patent is hereby corrected as shown below:

The Title page should be deleted and substitute the attached Title page.

Signed and Sealed this

Twenty-third Day of February, 1999

Attest:

Q. TODD DICKINSON

*Attesting Officer*     *Acting Commissioner of Patents and Trademarks*

United States Patent
Varo et al.

Patent Number: 5,459,360
Date of Patent: Oct. 17, 1995

[54] PISTON-MOUNTED POWER GENERATOR, ESPECIALLY FOR TELEMETRY SYSTEMS

[75] Inventors: Richard G. Varo; Steven A. Archuleta, both of Columbus, Ind.

[73] Assignee: Cummins Engine Company, Inc., Columbus, Ind.

[21] Appl. No.: 181,460

[22] Filed: Jan. 14, 1994

[51] Int. Cl.⁶ .................................. H02K 35/00
[52] U.S. Cl. .................................. 310/24
[58] Field of Search ............... 310/15, 17, 23, 310/24, 30, 34, 35, 14

[56] References Cited

U.S. PATENT DOCUMENTS

| | | | |
|---|---|---|---|
| 3,065,366 | 5/1959 | Speiser et al. | 310/15 |
| 3,105,153 | 8/1960 | James, Jr. | 290/1 |
| 3,206,609 | 4/1962 | Dawes | 290/1 |
| 4,019,103 | 4/1977 | Davis et al. | 318/37 |
| 4,631,455 | 12/1986 | Taishoff | 318/37 |
| 5,179,304 | 1/1993 | Kenjo et al. | 310/12 |

*Primary Examiner*—Steven L. Stephan
*Assistant Examiner*—Judson H. Jones
*Attorney, Agent, or Firm*—Sixbey, Friedman, Leedom & Ferguson

[57] ABSTRACT

A piston-mounted power generator has a piston-mounted magnet unit (1) formed of a coil (2) with a permanent magnet core (3) that is fitted with pole extensions (5, 6). The unit (1) is mounted to the piston skirt (8) with the pole extensions having a small clearance from the inner wall (10) of the piston cylinder formed by cylinder wall liner (12). Shallow grooves (14) are machined into the cylinder wall (10). The grooves (14) have a crescent-shaped longitudinal cross section, that extends circumferentially in the cylinder wall (10) for a distance that is only slightly longer than the width of the pole extensions. The width of each groove (14) is equal to the spacing between the pole extensions (5, 6) and the axial spacing between the adjacent pairs of grooves (14) is equal to the thickness of the pole extensions (5, 6). Electrical power is generated in the coil 2 by the rapid change in flux in the magnetic circuit linked through it as the effective gap between the poles and wall changes as the poles (5, 6) pass each of the grooves (14) and is maximized when the spacing of the poles and grooves results in the magnetic circuit being made and broken simultaneously at both poles. Transducers and telemetry modules (TTM) can be mounted within the interior of the piston and electrically connect to the coil to be powered thereby. To increase the power generated, the grooves (14') can be backfilled with a nonmagnetic material (15) by flame-spraying or the like. For special pistons, annular grooves can be used instead ones having the preferred crescent shape.

19 Claims, 5 Drawing Sheets

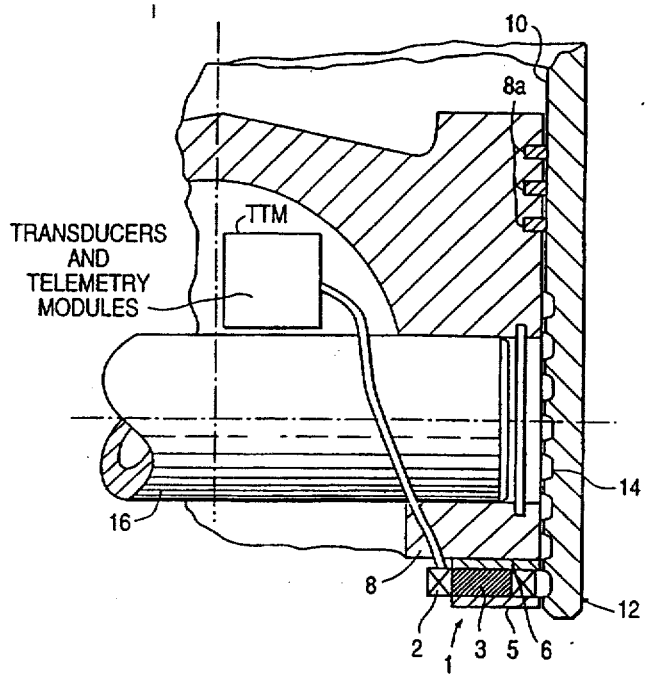

UNITED STATES PATENT AND TRADEMARK OFFICE
CERTIFICATE OF CORRECTION

PATENT NO. : 5,459,360

DATED : Oct. 17, 1995

INVENTOR(S) : Varo et al.

It is certified that error appears in the above-identified patent and that said Letters Patent is hereby corrected as shown below:

In the drawings, Sheet 1, Fig. 1, the lead line for the reference numeral 6 should be extended to the pole extension and thus, the drawing should appear as follows:

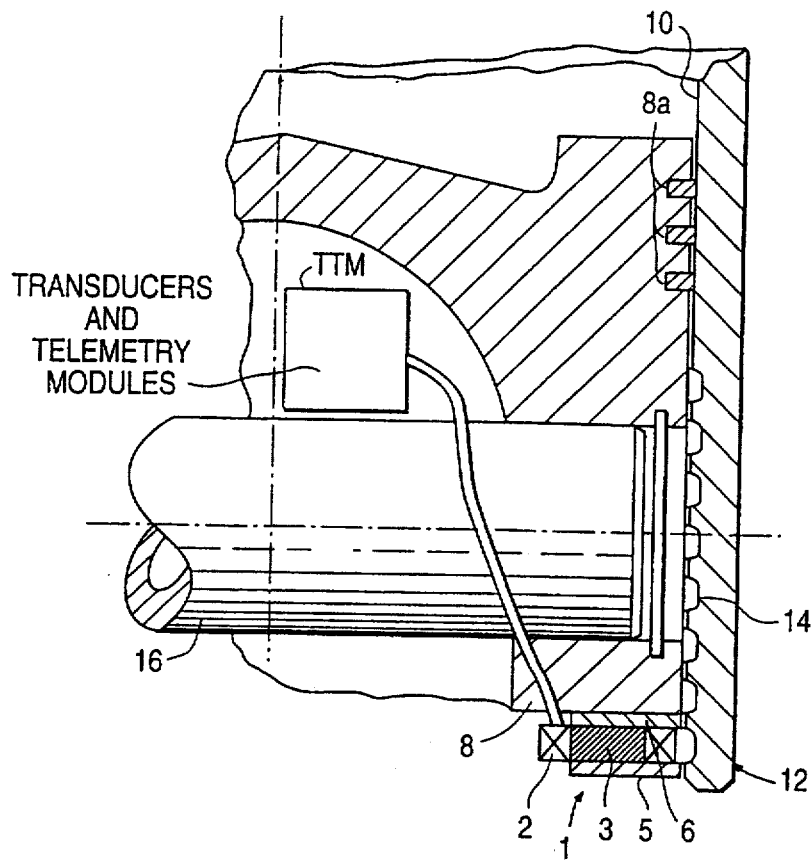

UNITED STATES PATENT AND TRADEMARK OFFICE
CERTIFICATE OF CORRECTION

PATENT NO. : 5,459,360

DATED : Oct. 17, 1995

INVENTOR(S) : Varo et al.

It is certified that error appears in the above-identified patent and that said Letters Patent is hereby corrected as shown below:

In the drawings, Sheet 2, Fig. 3, the lead line for the reference numeral 6 should be extended to the pole extension and thus, the drawing should appear as follows

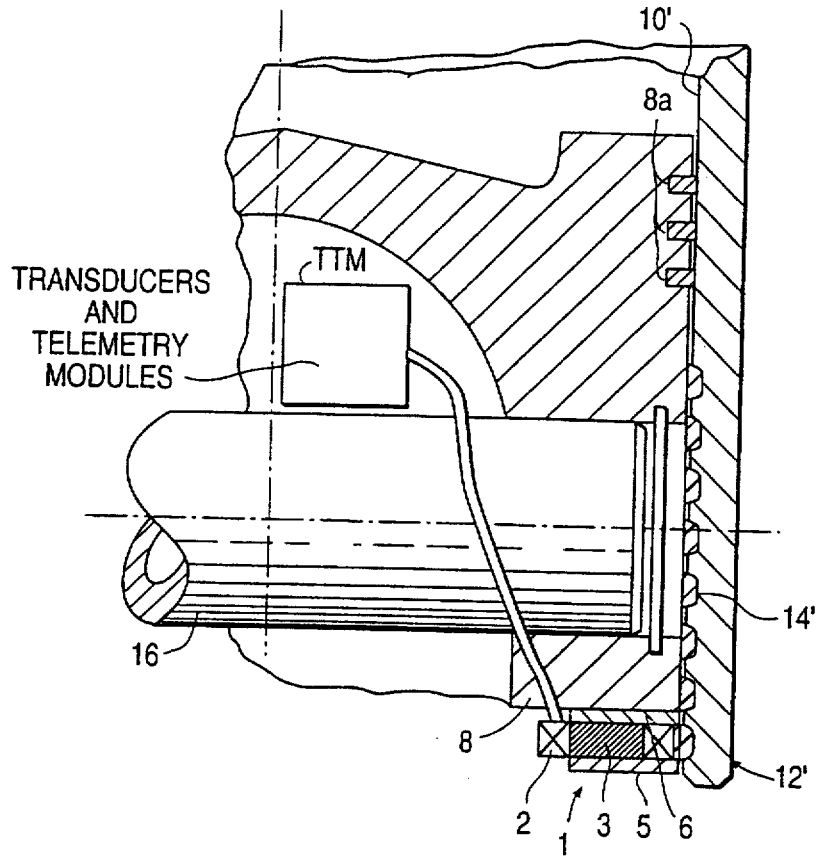

FIG. 3